(12) United States Patent
Tan et al.

(10) Patent No.: US 8,156,887 B2
(45) Date of Patent: Apr. 17, 2012

(54) FLAP MALFUNCTION DETECTION SYSTEM

(75) Inventors: Kee How Tan, Bothell, WA (US); Seiya Sakurai, Seattle, WA (US); Gary D. Oakes, Renton, WA (US); Philip Belanger, Redmond, WA (US); Jack S. Noble, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 698 days.

(21) Appl. No.: 12/291,194

(22) Filed: Nov. 7, 2008

(65) Prior Publication Data
US 2010/0116193 A1 May 13, 2010

(51) Int. Cl.
*B64C 3/50* (2006.01)
(52) U.S. Cl. .......................... 116/303; 116/281; 244/215
(58) Field of Classification Search .................. 116/303, 116/285, 281–284; 244/211–212, 214–215, 244/123.1, 99.3
See application file for complete search history.

(56) References Cited

U.S. PATENT DOCUMENTS

| | | | | | |
|---|---|---|---|---|---|
| 2,128,169 | A | * | 8/1938 | Shanley | 340/963 |
| 2,241,335 | A | * | 5/1941 | Wedberg | 244/217 |
| 2,320,870 | A | * | 6/1943 | Johnson | 244/123.8 |
| RE22,435 | E | * | 2/1944 | Evans | 116/285 |
| 2,430,927 | A | * | 11/1947 | Burder | 116/283 |
| 2,436,583 | A | * | 2/1948 | Lear | 116/284 |
| 2,478,967 | A | * | 8/1949 | Greene | 340/966 |
| 3,231,991 | A | * | 2/1966 | Wandscheer et al. | 37/280 |
| 2001/0035122 | A1 | * | 11/2001 | Margetts | 116/283 |

* cited by examiner

*Primary Examiner* — R. A. Smith
*Assistant Examiner* — Tania Courson
(74) *Attorney, Agent, or Firm* — Armstrong Teasdale LLP

(57) ABSTRACT

According to an embodiment, a flap malfunction indicator assembly for notifying an observer making a walk-around inspection of an aircraft of a malfunction of one or more connection points coupling a flap assembly to an aircraft wing includes a support mounted to the flap assembly having a perimeter defining an area, an indicator arm pivoted to the support and movable between a first stowed position in which a major portion of the arm is arranged substantially entirely within the area and a second deployed position in which a major portion of the arm is arranged substantially outside the area, a frangible pin or fastener securing the indicator arm to the support in the first stowed position, a trigger element mounted for rotation about a first pivot, an elongated pull linkage coupling the trigger element with a flap assembly, the pull linkage being supported for movement relative to the first pivot to cause rotation of the trigger element when malfunction of a flap assembly occurs, and a spring assembly at the support having one portion exerting a biasing force against a portion of the indicator arm located outside of the area, the spring assembly driving the indicator arm into the second deployed position when the frangible pin or fastener is broken.

17 Claims, 5 Drawing Sheets

FLAP MALFUNCTION DETECTION SYSTEM

FIELD OF THE DISCLOSURE

The present disclosure is directed to an apparatus and method for indicating aircraft wing flap malfunctions, and more particularly to a method and apparatus for detecting when certain aircraft wing flap structures malfunction, and then deploying a flag to visually indicate to inspecting personnel such malfunction.

BACKGROUND OF THE DISCLOSURE

Aircraft today typically include a fuselage, a pair of wings each extending laterally from the fuselage, and trailing edge devices, or "flaps", coupled to the wings. Generally, flaps carried by a wing are movable relative to the wing between a stowed position and a deployed position. In most aircraft, the flaps are coupled to the wing with a device mounted to wing structure. The mechanisms that are used to couple the flaps to the wing are many and of various structural configurations. Most include attachment elements connected to the flaps at attachment connection points that permit movement of the flaps in a multitude of vertical and horizontal motions as well as a combination of such motions. Historically, under certain abnormal conditions or circumstances, the attachment elements and the attachment connection points could break or otherwise not function properly. Present day systems generally do not include malfunction indicators that are triggered only when there is an improper functioning of one attachment element, or when one connection point requires replacement of the affected flap part.

Further, improper functioning of forward or aft attachment fittings on flap attachment carriages are not obvious to an observer on a walk around inspection.

It would therefore be highly desirable to have an apparatus for detecting malfunctions of flap connection elements or flap connection points that would not only detect such a malfunction, but also visually show to an inspector on the ground the malfunction of one or both attachment elements or one or both connection points.

Further it would be highly desirable to have a method for determining that one or more connection points between a flap structure and an aircraft wing was not functioning properly, and then providing an indication, to an inspector performing a walk-around inspection of aircraft flap and wing assemblies, of such malfunction.

SUMMARY OF THE DISCLOSURE

The present disclosure thus provides for a flap malfunction detection system that not only detects flap malfunctions but also provides an indication of such a condition to an observer performing a walk-around inspection of the aircraft.

The present disclosure also provides a method for quickly detecting and indicating flap assembly malfunctions on aircraft wing structures.

According to one exemplary embodiment, a flap malfunction indicator for informing an observer making a walk-around inspection of an aircraft of a malfunction of one or more connection points coupling a flap assembly to an aircraft wing includes a carriage coupled to an aircraft wing and an aircraft flap assembly mounted on the wing, the carriage being suspended from the aircraft flap assembly at fore and aft connection points and being supported by the aircraft wing for motion away from the aircraft flap assembly, a base plate mounted to the flap assembly aft of the carriage, a flag member rotatably mounted to the base plate and held in a stowed, non-visible, position by a frangible pin or fastener, a trigger assembly rotatably coupled the base plate, and including a portion connected with the carriage, the trigger assembly including an arm disposed proximal to the pin or fastener for breaking the pin or fastener when one of the fore or aft connection points of the carriage breaks or otherwise malfunction, and a spring element mounted adjacent, and operably connected to, the flag member for driving flag member away from the base plate into a visible, deployed, position. As used herein, the term exemplary indicates an example and not necessarily an ideal.

According to another embodiment, a method of informing an observer making a walk-around inspection of an aircraft wing of a malfunction of one or more connection points of a carriage movably mounted on an aircraft wing and coupled to an aircraft flap assembly includes the steps of mounting a flag housing at the juncture of the aircraft wing and the aircraft flap assembly, pivotally mounting a flag member in the housing, securing the flag member in a stowed position in which the flag member is housed substantially entirely within the housing and is non visible to the observer, coupling the carriage to the flag member so that movement of the carriage in response to malfunction of one or more carriage connection points imparts a force to the flag member urging the flag member to move from its stowed position to a deployed position in which a substantial portion of the flag member is visible to the observer, and driving the flag member into its deployed position when one or more carriage connection points malfunctions.

According to still another embodiment of the disclosure, a malfunction indicator for detecting and indicating malfunction of a flap assembly carried by an aircraft wing includes a support mounted to the flap assembly and having a perimeter defining an area, an indicator arm rotatably mounted to the support and being movable between a first stowed position in which a major portion of the arm is arranged substantially entirely within the area and a second deployed position in which a major portion of the arm is arranged substantially outside of the area, a frangible pin or fastener securing the indicator arm to the support in the first stowed position, a trigger element mounted for rotation about a first pivot, an elongated pull linkage coupling the trigger element with a flap assembly, the pull linkage being supported for movement relative to the first pivot to cause rotation of the trigger element when malfunction of the flap assembly occurs, and a spring assembly at the support and having one portion exerting a biasing force against a portion of the indicator arm located outside of the area, the spring assembly driving the indicator arm into the second deployed position when the frangible fastener or pin is broken.

Further aspects of the system and the method of using the system are disclosed herein. The features as discussed above, as well as other features and advantages of the present disclosure will be appreciated and understood by those skilled in the art from the following detailed description and drawings.

DETAILED DESCRIPTION OF THE DISCLOSURE

Embodiments of the present disclosure now will be described more fully hereinafter with reference to the accompanying drawing. However, many different embodiments are contemplated and the present disclosure should not be construed as limited to the embodiments set forth herein; rather, these embodiments are provided so that this disclosure will be thorough and complete and better convey the scope of the disclosure to those skilled in the art.

Figure 1:
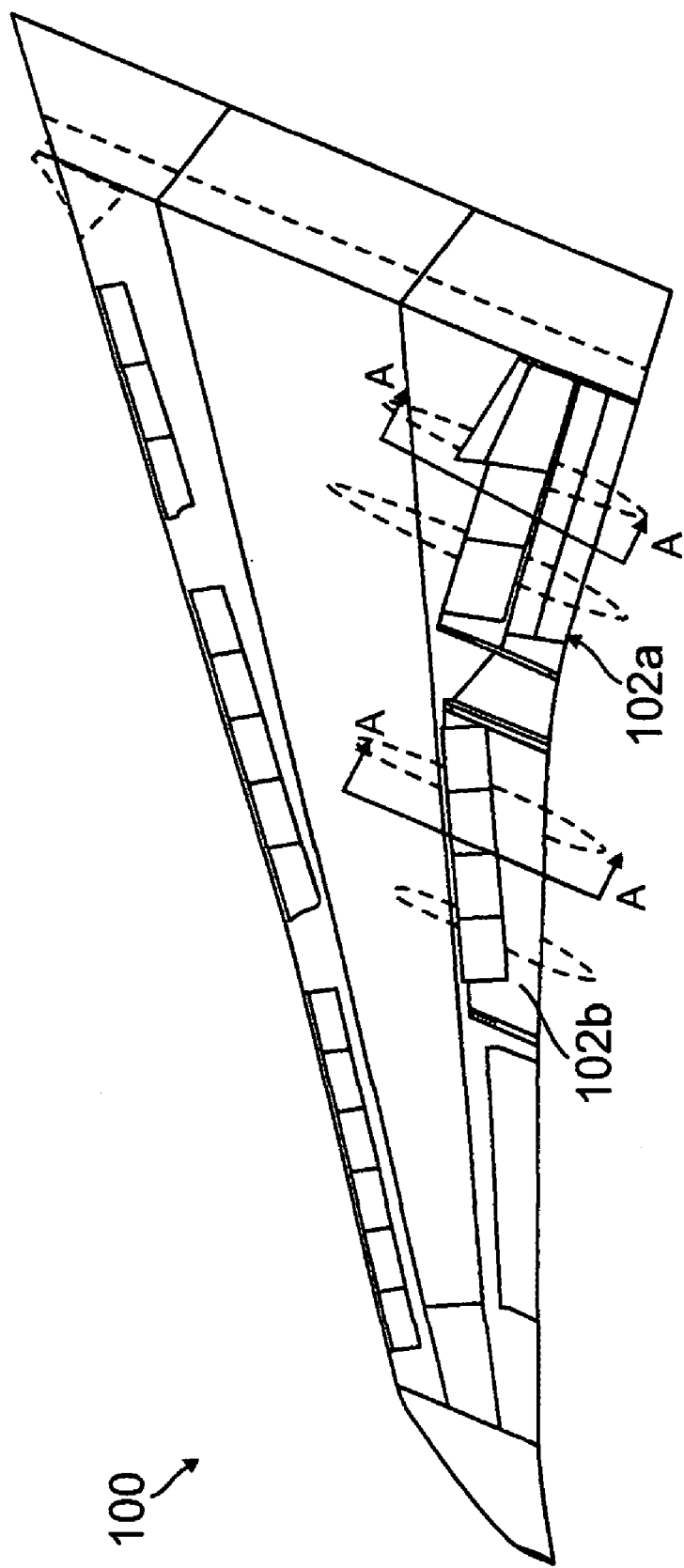
FIG. 1 is a schematic diagram of a wing of a high speed aircraft showing flap assemblies mounted to the trailing edge of the wing.

Referring now to FIG. 1, there is shown a wing assembly 100 of a high speed aircraft including various movable control surfaces, including flap assemblies 102a, 102b mounted adjacent to the trailing edge of the wing.

Figure 2:
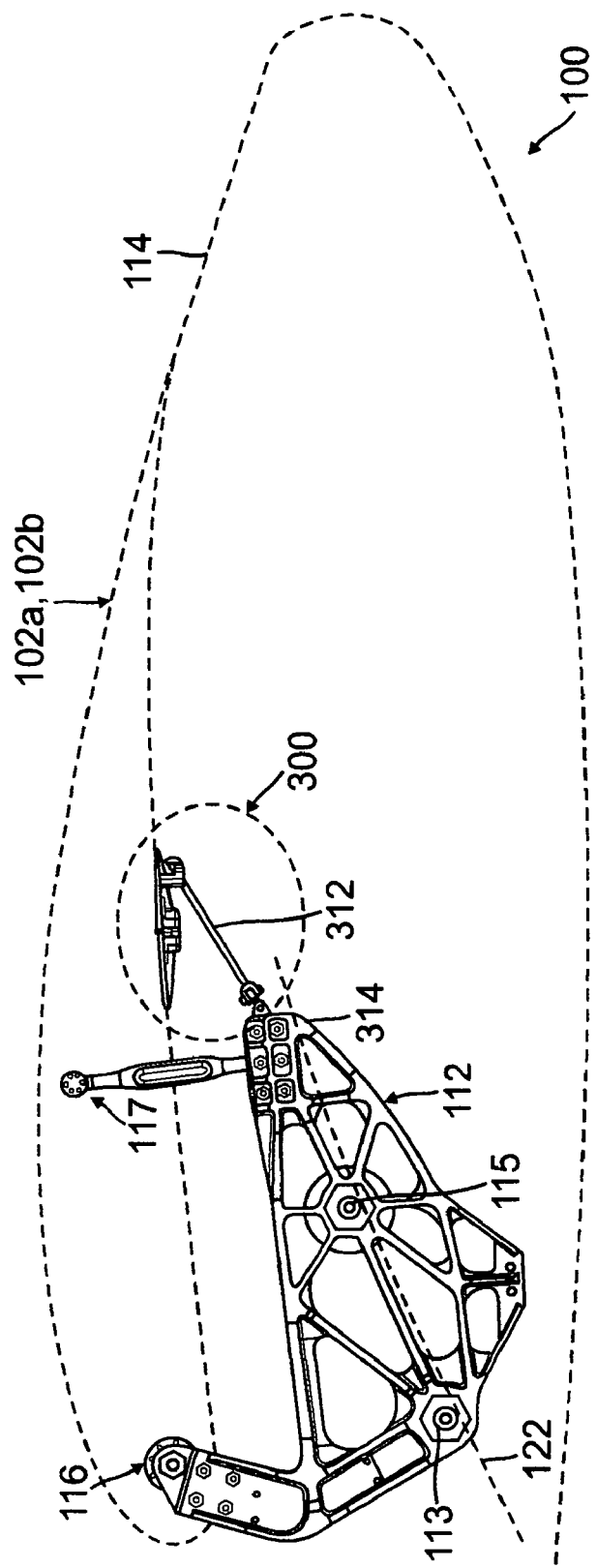
FIG. 2 is a partial-sectional view of the wing shown in FIG. 1 depicting a wing, a flap attachment structure, and a flap malfunction detection and indication assembly.

FIG. 2 is a partial cross-section view of the wing assembly 100 and one of the inboard and outboard flap assemblies shown in FIG. 1 taken at the section lines A-A in FIG. 1. A flap attachment assembly 112 is provided within the fairing 114 of the wing and is fashioned as a carriage mounted to a track (shown generally by the dotted line 122) housed within and formed as part of the wing assembly. The flap attachment assembly 112 is supported on the track by forward and aft mounting members 113 and 115. This mounting arrangement permits the carriage to change angle relative to the wing while translating along the track. The carriage includes forward and aft attachment elements 116 and 117 which couple the carriage to the flap assembly 102a or 102b. Each of the attachment elements are pivotally coupled to the flap assembly.

Figure 3:
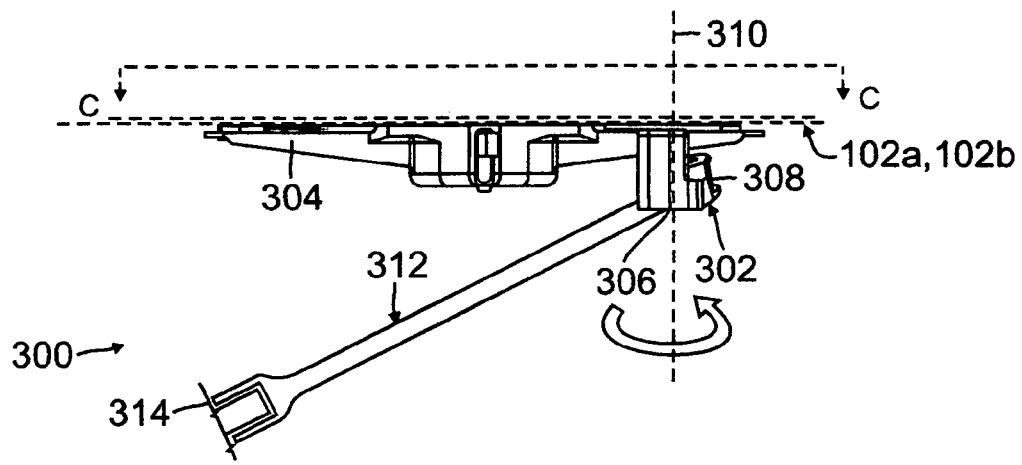
FIG. 3 is a side view of a flap malfunction detection and indication assembly mounted to the underside of the flap.

Located further aft of the aft flap attachment point 117 is a flap malfunction detection system 300 (see FIGS. 2 and 3) which includes a trigger crank assembly 302 supported on a plate 304 mounted to the undersurface of a respective one of the flap assemblies 102a or 102b. The plate carries a spindle 306 on which a trigger crank 308 is mounted for rotation about a rotation axis 310. A pull linkage 312 is connected between the trigger crank 308 and an aft region 314 of the carriage (refer to FIG. 2). The pull linkage responds to a malfunction at either the forward flap attachment point or the aft flap attachment point by moving forwardly relative to the spindle 306 and in so doing, exerting an abrupt pulling or yanking force on the trigger crank causing the latter to rotate about the rotation axis 310.

Figure 4:
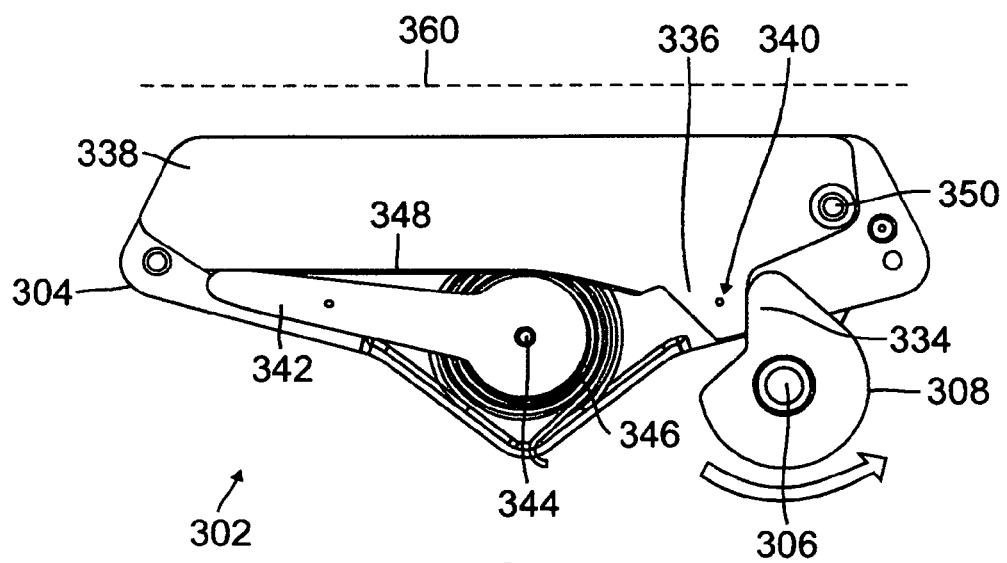
FIG. 4 is a plan view, taken along section line C-C in FIG. 3, of a flap malfunction detection and indication assembly, with the indicator shown in a stowed position.
Figure 5:
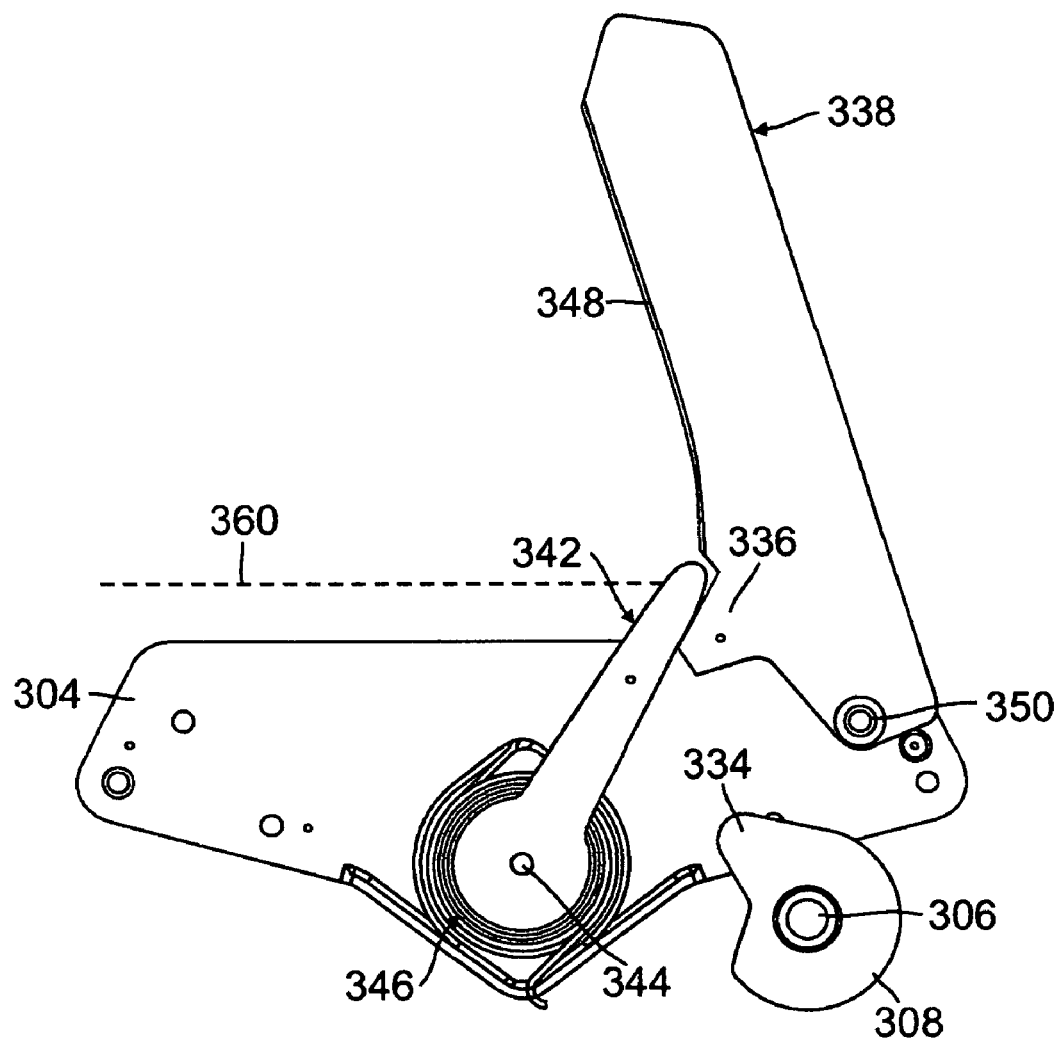
FIG. 5 is a plan view, taken along section line C-C in FIG. 3, of the first embodiment of the flap malfunction detection and indication assembly, with the indicator shown in a deployed position.

FIGS. 4 and 5 are planar views of a first embodiment of the trigger crank assembly 302, showing a trigger crank 308 pivotably mounted to the plate 304 about a pivot pin or fastener 306, and having a nose portion 334 bearing against a lateral shoulder 336 of a flag 338 that is secured in a fixed location relative to the plate 304 by a frangible shear pin or fastener 340. A flag deployment arm 342 is pivotably mounted to the plate 304 about a pivot axis 344, and is urged in a clockwise motion about the pivot axis by a coiled, or clock, spring 346 in which energy is stored in tension. Preferably, the flag is provided with a startling and very visually noticeable color coating, as for example red, orange, or yellow paint.

If either of the forward or the aft flap attachment points break down or malfunction, the linkage 312 is pulled forwardly and downwardly away from the trigger crank assembly 308 due to the rapid forward and downward movement of the carriage, and the trigger crank is abruptly forced into a rotational movement about the trigger crank rotation axis 310 in a first rotational direction (shown as a counterclockwise direction in FIG. 4). The nose portion 334 of the trigger crank then pushes against the lateral arm of the flag member 338 with a force sufficient to cause the frangible shear pin or fastener 340 to break. This then permits the force of the spring 346 to drive the flag deployment arm 342 in a second rotational direction (shown as a clockwise direction in FIG. 5) opposite to the first rotational direction. The flag deployment arm 342, under influence of the biasing force imparted to it by the clock spring 346, bears against and rides along a lateral surface 348 of the flag 338 as the flag moves in rotation about the flag pivot 350 from the stowed position shown in FIG. 4 to the deployed position shown in FIG. 5. As a result, the flag 338 is pivotally flung outwardly of the perimeter of the plate 304 in the second rotational motion away from the clock spring.

Figure 6:
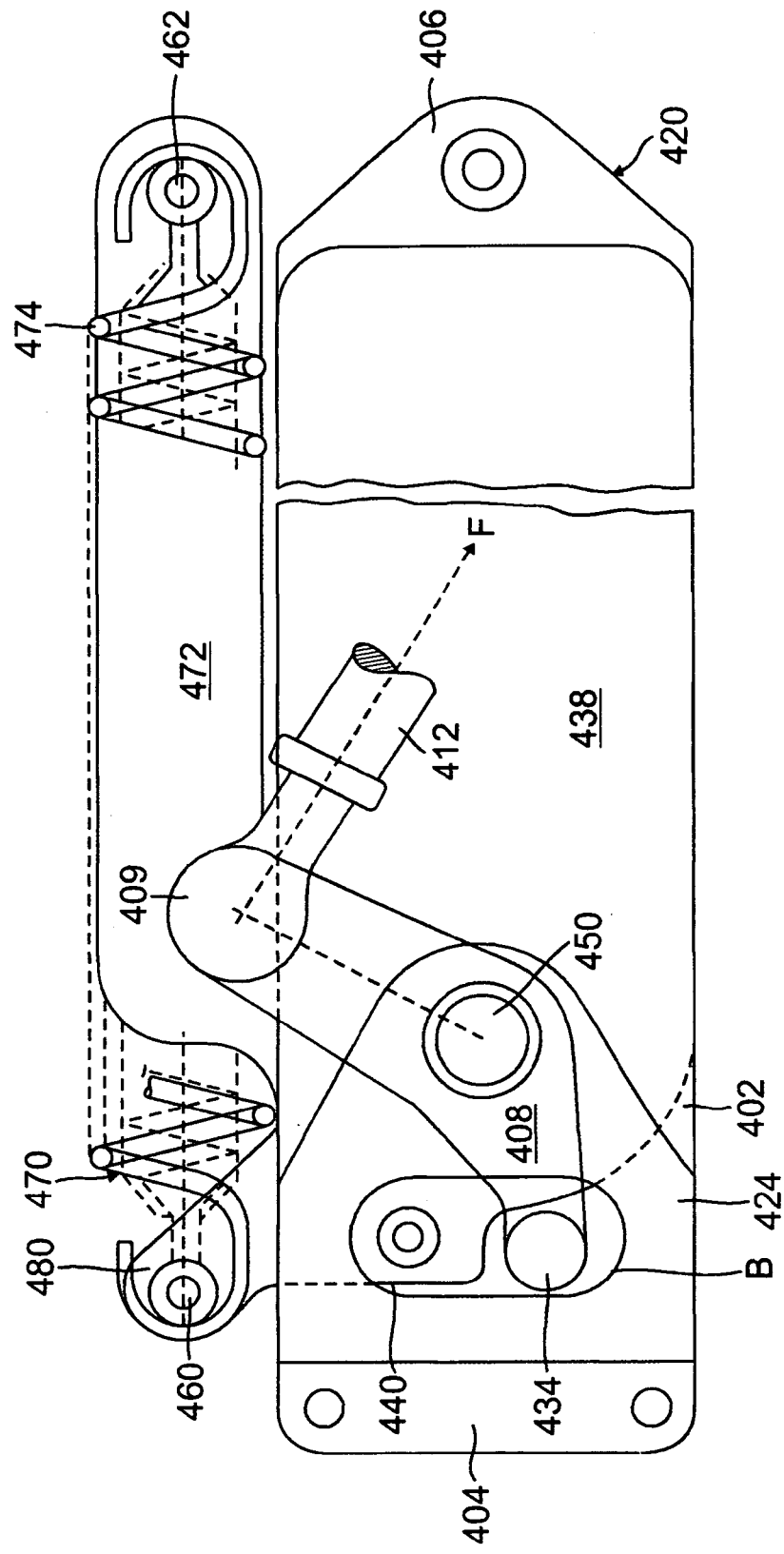
FIG. 6 is a plan view of a second embodiment of a flap malfunction detection and indication assembly shown in FIG. 3, with the indicator shown in a stowed position.

FIG. 6 depicts a second embodiment of a flap malfunction detection and indication assembly of the present disclosure. In this embodiment, a flag 438 is initially stowed entirely within an area defined by the perimeter of a housing 420. The housing includes a rectangular base plate 402 located under the flag 438 extending between opposite ends 404, 406 of the housing A pull linkage 412 is connected between a carriage supported on an aircraft wing assembly and a trigger linkage 408 at one end 409 of the trigger linkage. The trigger linkage includes a central portion mounted to the housing at a pivot 450 and opposing ends 409 and 434. The pivot 450 is secured to a housing portion 424 located at one end 404 of the housing 420. End 434 of the trigger linkage is positioned in the near vicinity of a frangible shear pin or fastener 440 that secures the flag 438 to the housing portion 424 and within the perimeter of the housing 420. The flag includes a tail portion 480 that is secured via a fastener element 460 to one end of a spring assembly 470 that includes a tubular housing 472 disposed adjacent to the housing. The spring assembly may include one or more spring members 474 held in tension, and connected, between a first connection point 460 and a second connection point 462 (in the Figure, the spring assembly is shown as two coiled concentrically arranged spring members, but a single spring member or multiple spring members, are also contemplated). Preferably, the flag is provided with a startling and very visually noticeable color coating, as for example red, orange, or yellow paint.

If either of the fore or aft flap attachments malfunction, the carriage moves forwardly and downwardly away from the flap assembly. This motion of the carriage imparts a pulling force F to the pull linkage 412. As a result, the linkage 412 moves in the direction of the force F and in turn pulls on and moves the end 409 of the trigger linkage 408 in the direction of the force F. This movement will cause the trigger linkage to pivot in a clockwise direction about the pivot point 450 and thereby cause the end 434 of the trigger linkage to move upwardly so that the end 434 first engages, and then causes, the breakage of the frangible shear pin or fastener 440. Upon breakage of the shear pin, the spring assembly 472, which is held in a stretched position while the flag is retained by the shear pin or fastener in its stowed position, becomes free to contract so that the left end of the spring assembly that is hooked around the fastener 460 is pulled to the right. As the tension in the spring assembly is released, the one end of the spring assembly hooked around the fastener 460 travels toward the other end 462 of the spring assembly, and in so doing, moves the flag tail portion 480 with it, thereby causing the flag 438 to pivot clockwise about the pivot point 450 and to be pivotally driven out of a stowed position within the housing 420 into a deployed, now visible, position.

In both of the embodiments of the present disclosure, the deployment of the flag from a first position within the perimeter of the flag housing wherein the flag is hidden from view to a second position wherein a substantial portion of the flag is positioned outside the flag housing and is visible to an observer making a walk-around inspection of the aircraft wing. The deployment of the flag from the flag housing is accomplished entirely through cause and effect actions of aircraft mechanical components; no electronics, electrical control elements or sensors are employed.

It will be understood by those skilled in the art that various changes may be made and equivalents may be substituted for elements thereof without departing from the scope of this disclosure. In addition, many modifications may be made to adapt a particular situation or material to the teachings of the disclosure without departing from the essential scope thereof. Therefore, it is intended that this disclosure not be limited to the particular embodiment disclosed as the best mode contemplated for carrying out this invention, but that the disclosure will include all embodiments falling within the scope of the appended claims.

The invention claimed is:

1. An assembly for detecting and indicating malfunction of a flap assembly carried by an aircraft wing, comprising:
   a support mounted to the flap assembly and having a perimeter defining an area,
   an indicator arm rotatably mounted to the support and being movable between a first stowed position in which a major portion of the arm is arranged substantially entirely within the area and a second deployed position in which a major portion of the arm is arranged substantially outside of the area,
   a frangible fastener securing the indicator arm to the support in the first stowed position,
   a trigger element mounted for rotation about a first pivot,
   an elongated pull linkage coupling the trigger element with the flap assembly, the pull linkage being supported for movement relative to the first pivot to cause rotation of the trigger element when malfunction of the flap assembly occurs, and
   a spring assembly at the support and having one portion exerting a biasing force against a portion of the indicator arm located outside of the area, the spring assembly driving the indicator arm from the first stowed position towards the second deployed position when the frangible fastener is broken.

2. The assembly of claim 1, wherein the spring assembly comprises a spring element held in a position by the frangible fastener in which it is ready to release its biasing force, the spring element being released to exert its biasing force on a portion of the indicator arm outside of the area when the pull linkage moves in response to malfunction of the flap assembly and the frangible fastener is broken.

3. The assembly of claim 2, wherein the spring element comprises at least one coiled spring having a first end connected to the support and a second end coupled with the portion of the indicator arm located outside of the area.

4. The assembly of claim 2, wherein the spring assembly comprises two concentric coiled springs each having a first end connected to the support and a second end coupled with the portion of the indicator arm located outside of the area.

5. The assembly of claim 1, wherein the trigger element comprises at least one arm portion extending away from the first pivot and having an end arranged in near proximity to the frangible fastener when the indicator arm is in its stowed position, the end of the arm portion being arranged to break the frangible fastener when the trigger element is rotated about the first pivot in response to a force exerted on the pull linkage by the malfunction of the flap assembly.

6. The assembly of claim 5, wherein the spring assembly further includes a spring element and an elongated arm biased into engagement with one side of the indicator arm by the spring element, the elongated arm being mounted to the support for rotation about a second pivot when the frangible fastener is broken to drive the indicator arm in rotation about the second pivot to the second deployed position.

7. The assembly of claim 6, wherein the indicator arm includes a shoulder portion on the one side of the indicator arm against which the elongated arm bears when the indicator arm is in its deployed position to hold the indicator arm in its deployed position.

8. The assembly of claim 5, wherein the indicator arm and the trigger element are connected to one another at the first pivot, and the spring assembly includes a spring element having a first end portion secured to the support and a second end portion coupled to the indicator arm.

9. The assembly of claim 8, wherein the first and second end portions of the spring element are held in a spaced-apart, tensioned, position by the frangible fastener so that when the fastener breaks, the second end portion of the spring element is free to be drawn toward the first end portion of the spring element as the tension in the spring element is released, and in moving in such a manner, the second end portion of the spring element pulls the indicator arm from the stowed position to the deployed position.

10. The assembly of claim 9, wherein the spring element comprises a coiled spring.

11. The assembly of claim 9, wherein the spring element comprises two concentric coil springs.

12. A flap malfunction indicator for informing an observer making a walk-around inspection of an aircraft of a malfunction of one or more connection points coupling an aircraft flap assembly to an aircraft wing, comprising:
   a carriage coupled to the aircraft wing and the aircraft flap assembly mounted on the aircraft wing, the carriage being suspended from the aircraft flap assembly at fore and aft connection points and being supported by the aircraft wing for motion away from the aircraft flap assembly,
   a base plate mounted to the aircraft flap assembly aft of the carriage,
   a flag member rotatably mounted to the base plate and held in a stowed, non-visible, position by a frangible fastener,
   a trigger assembly rotatably coupled the base plate, and including a portion connected with the carriage, the trigger assembly including an arm disposed proximal to the fastener for breaking the fastener when one of the fore or aft connection points of the carriage malfunctions, and
   a spring element mounted adjacent, and operably connected to, the flag member for driving said flag member away from the stowed, non-visible, position towards a visible, deployed, position.

13. A method of informing an observer, making a walk-around inspection of an aircraft wing, of a malfunction of one or more connection points of a carriage movably mounted on the aircraft wing and coupled to an aircraft flap assembly, comprising:

mounting a flag housing at the juncture of the aircraft wing and the aircraft flap assembly, pivotally mounting a flag member in the housing, connecting a biasing member between the flag member and the housing, holding the biasing member in tension with a frangible fastener to secure the flag member in a stowed position in which the flag member is housed substantially entirely within the housing and is non visible to the observer, coupling the carriage to the flag member so that movement of the carriage in response to malfunction of one or more carriage connection points imparts a force to the flag member urging the flag member to move from its stowed position to a deployed position in which a substantial portion of the flag member is visible to the observer, and driving the flag member into its deployed position when one or more carriage connection points malfunctions.

14. The method of claim 13, wherein the biasing member comprises at least one coiled spring.

15. The method of claim 13, wherein the step of driving the flag member into its deployed position when the carriage experiences movement in response to malfunction of the aircraft flap assembly comprises mounting a trigger element on a pivot with a first end of the trigger element in close proximity to the frangible fastener, coupling a second end of the trigger element to the carriage, and positioning the trigger element on the pivot such that the first and second ends of the trigger element are disposed on opposite sides of the pivot.

16. The method of claim 15, wherein the step of driving the flag member into its deployed position further comprises coupling the biasing member between one end of the flag member and the housing for urging the flag member from its stowed position to its deployed position, and moving the carriage in response to malfunction of one or more connection points of the aircraft flap assembly to move the first end of the trigger element into engagement with and break the frangible fastener.

17. A malfunction indicator for detecting and indicating malfunction of a flap assembly carried by an aircraft wing, comprising:

a support mounted to the flap assembly and having a perimeter defining an area, an indicator arm rotatably mounted to the support and being movable between a first stowed position in which a major portion of the arm is arranged substantially entirely within the area and a second deployed position in which a major portion of the arm is arranged substantially outside of the area, a frangible fastener securing the indicator arm to the support in the first stowed position, a trigger element mounted for rotation about a first pivot, an elongated pull linkage coupling the trigger element with the flap assembly, the pull linkage being supported for movement relative to the first pivot to cause rotation of the trigger element when malfunction of the flap assembly occurs, and a spring assembly at the support and having one portion exerting a biasing force against a portion of the indicator arm located outside of the area, the spring assembly driving the indicator arm from the first stowed positioned towards the second deployed position when the frangible fastener is broken.

* * * * *